Figure 1:
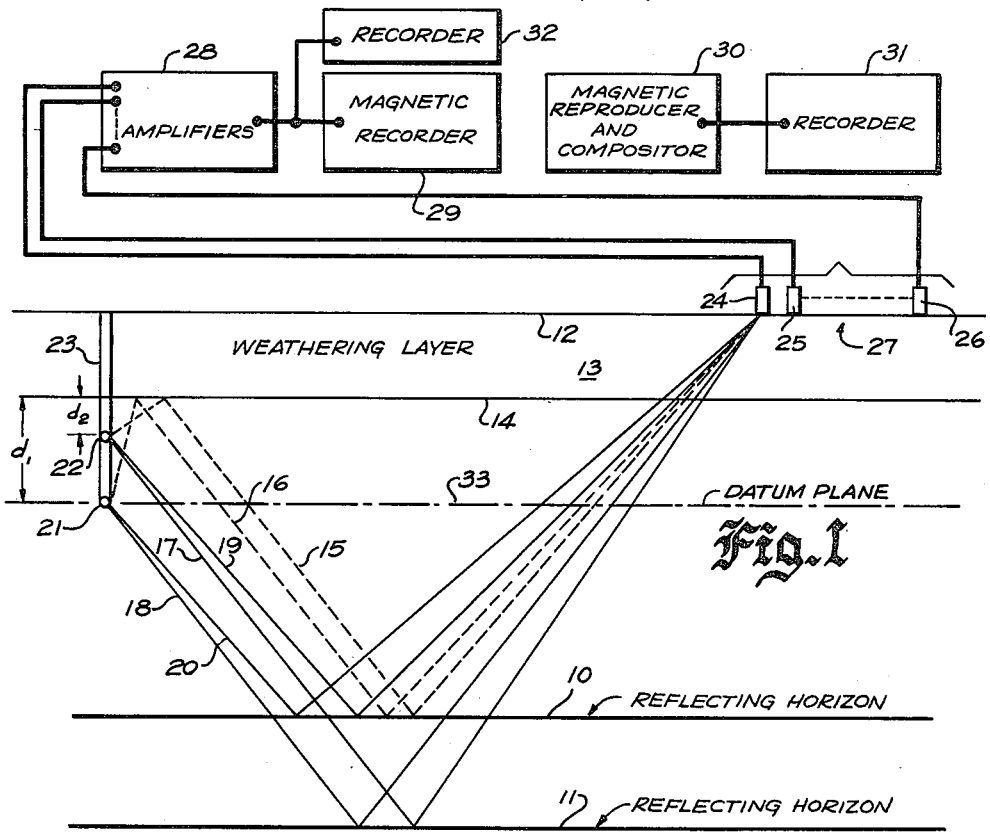

Jan. 30, 1962 J. W. HAMMOND 3,018,838
METHOD OF SEISMIC PROSPECTING
Filed Jan. 12, 1956

INVENTOR
Joseph W. Hammond
BY
Mason, Kolehmainen, Rathburn and Wyss
ATTORNEYS

United States Patent Office 3,018,838
Patented Jan. 30, 1962

3,018,838
METHOD OF SEISMIC PROSPECTING
Joseph William Hammond, Tulsa, Okla., assignor to Seismograph Service Corporation, Tulsa, Okla., a corporation of Delaware
Filed Jan. 12, 1956, Ser. No. 558,717
2 Claims. (Cl. 181—.5)

The present invention relates generally to a method of seismic prospecting and more particularly to an improved method of obtaining seismographic records in the art of geophysical prospecting.

Fundamentally, the art of seismic surveying is based upon the generation of sound or seismic waves in the earth's crust and detecting, recording and interpreting the waves which are reflected and refracted back to the earth's surface from buried strata interfaces and the like. Present practice in the generation of seismic waves usually involves the detonation of dynamite or other explosives within a shothole usually drilled below the weathering or low velocity layer of the earth's crust. Detonation of the explosive charge below the earth's weathering layer is usually necessary in order to avoid generating excessive amounts of undesired surface or near surface seismic wave energy traveling practically horizontally to the points of wave detection which are generally aligned and spaced some distance from the source of the seismic waves. By measuring the time interval between the initial propagation of the wave and its arrival at each of the detection points after being reflected from the buried strata interfaces, information is available for making a definite determination of the configuration and location of the subsurface formations. The location of the source of the seismic waves below the weathering layer or below the air-to-ground contact at the earth's surface induces the arrival at the detecting points of certain undesired energy which is customarily referred to as a "ghost reflection" and which results from travel of the seismic wave energy to the weathering layer or at the air-to-ground contact where such energy is reflected downwardly to the subsurface interface under investigation and is there re-reflected back to the spaced detecting points. These undesired "ghost reflections" generally possess frequencies approximating those of the desired reflected and refracted waves and, hence, cannot be filtered prior to recording. Thus, the ghost reflections have the effect of confusing or obscuring the records of the desired reflected waves so as to render record interpretation difficult or impossible. In many areas, the ghost reflections are of such large magnitude and are so oriented on the records produced that the analyst frequently confuses them with the desired reflected wave energy from one or more of the subsurface interfaces and, accordingly, the analysis may indicate the presence of a buried subsurface interface which does not actually exist. Obviously, it would be desirable to eliminate the possibility of obtaining such false and misleading information.

Therefore, one of the primary objects of the present invention is to provide an improved method of seismic prospecting wherein the ghost reflections described above are either eliminated or are so minimized that the possibility of misinterpretation of the collected data is negligible.

It is another object of the invention to provide a method of seismic prospecting wherein seismic waves are created at source points relatively displaced with respect to the reflecting strata so that the ghost reflections arriving at the spaced detecting positions as a result of the waves emanating from each source are displaced in phase and may be eliminated.

Figure 2:
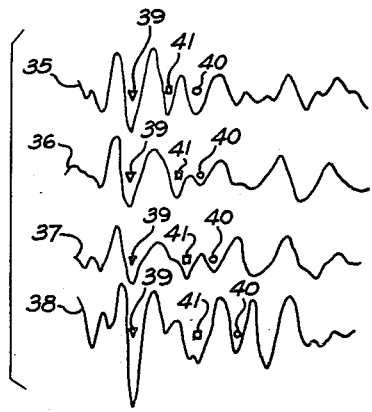
Figure 3:
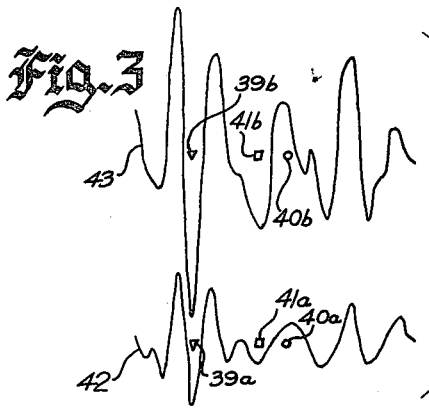

It is a further object of the present invention to detonate explosives at spaced points below the air-to-ground contact, which points are so displaced that the ghost reflections arriving at the spaced detecting positions may be mutually canceled during compositing of the records produced at the detecting positions while, at the same time, accentuating the true reflections. The invention, both as to its organization and method of operation, together with other objects and advantages thereof, will best be understood by reference to the following specification taken in connection with the accompanying drawings in which:

FIG. 1 diagrammatically illustrates apparatus which may be used in the practice of the present invention together with a sectional view of a typical portion of the earth's crust that might be encountered in the practice of the present invention;

FIG. 2 shows a plurality of typical graphs representative of signals obtained in accordance with the present invention from seismic wave energy generated at different depths; and FIG. 3 shows a group of curves resulting from compositing the graphs shown in FIG. 2.

Referring now to the drawings and particularly to FIG. 1 thereof, it will be observed that there is illustrated diagrammatically a section of the earth's crust which might be encountered in the practice of the present invention. The particular section shown includes a plurality of subsurface strata defined by buried interfaces which are labeled reflecting horizons and are respectively indicated by the reference numerals 10 and 11. These subsurface interfaces, as illustrated, are located some distance below the surface of the earth indicated by the reference numeral 12. The portion of the earth's crust located directly adjacent the earth's surface, known as the weathering layer, is indicated by the reference numeral 13 and extends from the surface 12 of the earth to a boundary layer 14 which may vary from level although in FIG. 1 it is shown as being horizontal. The depths of the various layers shown and the underground positions of the interfaces 10 and 11 are not intended to be scaled in FIG. 1, but are shown in diagrammatic form for purposes of illustration only.

In accordance with the present invention, the subsurface strata are profiled by a method which includes the generation of seismic waves at different shot points vertically spaced below the earth's surface. A plurality of collinear receptors or detectors, known as a detector array, are provided for receiving the reflections and refractions from the subsurface formations resulting from the generated seismic wave energy. Separate phonographically reproducible records are initially made of the seismic signals received at the detector array from each of the spaced shot points. The sources of seismic wave energy are so displaced and the reproducing apparatus for the reproducible records is so adjusted that ghost reflections reproduced from the records are out of phase with respect to each other while the reproduced energy resulting from the waves reflected from the subsurface interfaces under investigation, generally termed the true reflections, is in phase. During reproduction of the phonographically reproducible records, the signals from the individual records are added together in such a manner as to produce a composite record wherein the ghost reflections are mutually canceled as a result of the out of phase relationship therebetween while the true reflections are accentuated somewhat as a result of the in-phase relationship existing therebetween.

Specifically, as shown in FIG. 1, a plurality of spaced shot points at which seismic waves are generated are indicated by the reference numerals 21 and 22. These spaced shot points are illustrated as being vertically displaced within a borehole 23 which extends some distance into the earth's crust and which is formed and located in the manner customarily followed in seismic prospecting. The seismic waves may be generated in conventional manner, for instance, by the detonation of explosives generally called shots or by excitation of the earth formations by a suitable transmitter of elastic wave energy. For the purposes of the present invention it will be assumed that explosive generation is employed and for that purpose explosives are placed at the shot points 21 and 22 within the borehole 23. In the system shown in FIG. 1 the shot points 21 and 22 are illustrated as being disposed below the lower boundary 14 of the weathering layer although this is not at all necessary since either or both of the shot points 21 and 22 may be disposed above the boundary 14, the only requirement being that both shot points are located below a reflecting boundary or interface which is effective in a manner described more fully below to produce objectionable ghost reflections. Upon the detonation of explosives at the point 21, as indicated by the solid lines 18 and 20 in FIG. 1, seismic waves are directed to the reflecting horizons 10 and 11 where they are reflected to a detector array 27 comprising a plurality of horizontally spaced detector means in the form of seismic wave receivers or detectors 24, 25, 26, etc. The latter receivers are arranged colinearly with respect to the borehole 23 but are spaced different horizontal distances therefrom. It is to be understood that any number of seismic wave receivers may be employed in the detector array 27. The receivers of the array 27 also receive ghost reflections emanating from the shot point 21 which travels upwardly to the boundary layer 14 where, as indicated by the dotted line 16, it is reflected downwardly to the horizon 10 and from there is re-reflected to the detector array 27. The energy received as a result of the detonation of the explosives at the shot point 21 is applied through suitable amplifying equipment 28 to recording apparatus 29 which produces a phonographically reproducible record having a plurality of distinguishable traces thereon, each representative of the energy received at one of the detectors in the array 27. The output signals from the amplifying equipment are also applied to conventional recording apparatus 32 which may be of the oscillographic type for producing a visible record which may be analyzed in the field to promote the progress of the survey. The amplifying equipment 28 and the recording apparatus 29 may be of the type illustrated and described in the copending application Serial No. 281,105 of Joseph A. Sharpe, filed April 8, 1952, now Patent No. 2,795,287 and assigned to the same assignee as the present invention. With equipment of this type being employed, the recording apparatus 29 functions to record, preferably upon a magnetizable medium, the signals received by the spaced detectors of the array 27. The signals received at each detector are recorded simultaneously to produce a plurality of side by side traces on the record.

In accordance with the present invention, seismic waves are next generated at the shot point 22. These waves, as indicated by the solid lines 17 and 19, are directed towards the reflecting horizons 10 and 11 where they are reflected back to detectors of the array 27. At the same time, the energy created at the point 22 is directed upwardly to the boundary layer 14 where it is reflected, as indicated by the dotted line 15, to the horizon 10 for re-reflection to the detector array 27. As indicated above, the energy which traverses the path indicated by the dotted line 15 is termed a ghost reflection and is passed to the amplifiers 28, together with the desired reflected wave energy represented by the solid lines 17 and 19. All of this energy is recorded by the recording apparatus 29 to produce a second phonographically reproducible record indicative of the energy arriving at the detectors of the array 27 from the shot point 22. Since the ghost reflections may also occur at the air surface interface 12, it will be observed that the present invention is useful in cases where the shot points are located below an interface in such manner that waves from both shot points are reflected downwardly to develop ghost reflections.

The ghost reflections may appear on the records produced by the recording apparatus at time positions corresponding to the arrival of the true reflections from the interface 11 and, accordingly, it is probable that confusion will result. Thus, the analyst may well interpret the ghost reflections as indicating the presence of an additional interface near the reflecting horizon 11. Moreover, the ghost reflections may tend to obscure or override the true reflections from the horizon 11 with the result that useful information will be lost or will not be recognizable.

To obviate the difficulties just described, the two phonographically reproducible records produced by the recording apparatus 29 are supplied to a suitable reproducing and compositing apparatus 30 which may be of the type shown and described in the above-identified copending application of Joseph A. Sharpe. The compositing apparatus effectively provides a point by point addition of time correlated points on the two records produced by the magnetic recording apparatus 29 and supplies signals to a recording apparatus 31 for the purpose of developing a permanent composite record. Moreover, the reproducing apparatus includes at least one reproducing head associated with each of the traces on the records with adusting means for altering the relative position of each head with respect to its associated trace, thereby facilitating the adjustment of the relative time of reproduction of the signals appearing on the records.

As previously indicated, the shot points 21 and 22 are so displaced and the reproducing heads are so adjusted that the ghost reflections reproduced from the two records by the reproducing and compositing apparatus 30 are displaced in phase by approximately 180 electrical degrees with the result that such ghost reflections are eliminated or are greatly attenuated in the composite record produced by the recording apparatus 31. The amount of displacement between the shot points and the degree of adjustment of the reproducing heads of the apparatus 30 necessary to effect this desired result may be determined in the manner described below.

Assume first a datum plane 33 passing through the shot point 21. This particular datum is selected merely for convenience since any other suitable reference horizon could be selected. Assume also a velocity of propagation of V in the area surrounding the shot points 21 and 22 and below the boundary 14. At this point it should be observed that if the ghost reflections were being caused by a reflection from the air-to-surface interface 12, a different velocity of propagation would be used. In any event, the record analyst or those in charge of the survey will generally have available sufficient information to determine the particular velocity of propagation in the area surrounding any selected shot point sites so that this quantity is actually a known value. As indicated in FIG. 1, the depth of shot point 21 below the reflecting interface 14 giving rise to the ghost reflections is represented as $d_1$ while the depth of shot point 22 below the same interface is $d_2$. If we neglect slant travel times (as we may do in actual practice where the horizons 10 and 11 are disposed several thousand feet below the shot points), we may assume vertical paths for the true reflections and the ghost reflections. The ghost reflection travel time $t_{g21}$ from shot point 21 to the datum plane 33 over path 16 may be expressed as:

$$t_{g21} = \frac{2d_1}{V} \quad (1)$$

The ghost reflection travel time $t_{g22}$ from shot point 22 to the datum plane 33 over path 15 may be expressed as:

$$t_{g22} = \frac{d_2 + d_1}{V} \quad (2)$$

The difference in ghost reflection travel times $t_{gd}$ may be found by subtracting Equation 2 from Equation 1:

$$t_{gd} = \frac{d_1 - d_2}{V} \quad (3)$$

The true reflection wave travel time $t_{R21}$ from shot point 21 to the datum plane 33 is, of course:

$$t_{R21} = 0 \quad (4)$$

The true reflection wave travel time $t_{R22}$ from shot point 22 to the datum plane 33 is:

$$t_{R22} = \frac{d_1 - d_2}{V} \quad (5)$$

The difference in true reflection wave travel times $t_{Rd}$ may be computed by subtracting Equation 5 from Equation 4, in which case:

$$t_{Rd} = -\frac{d_1 - d_2}{V} \quad (6)$$

The difference between the ghost reflection time difference and the true reflection time difference is:

$$t_{gd} - t_{Rd} = \frac{2(d_1 - d_2)}{V} \quad (7)$$

Equations 3 and 6 show that the difference in travel times for shots from different depths for both the ghost reflections and the true reflections are the same in value but opposite in signs. This means that the ghost reflection travel time decreases with a more shallow shot while the true reflection wave travel time increases by the same amount. The reproducing heads of the apparatus 30 may be initially adjusted to introduce a datum correction to all of the traces appearing upon the reproducible record made from the shot point 21 in the manner described in copending application Serial No. 362,766 of James E. Hawkins, filed June 19, 1953, now U.S. Patent No. 2,946,393, and assigned to the same assignee as the present invention. As described in the latter application, when such a correction is introduced the reproduced signals bear the same time relationship to each other as they would have if the detectors of the array 27 were all located at an elevation corresponding to the datum plane 33. A similar correction may be made for the record derived from the waves emanating from the shot point 22. However, even if these corrections are made, a composite record derived from a summation of signals reproduced from the two records would still fail to show an improvement in the relative amplitudes of the true reflections and the ghost reflections since the phase displacement between the true reflections would still be equal to the phase displacement between the ghost reflections, even though these displacements are in the opposite direction. However, if the second reproducible record from shot point 22 is further corrected by an amount necessary to make the true reflection time correspond with the value it would have if the shot had originated at shot point 21, the ghost reflection on the second record will be displaced by an equal amount. The value of the latter correction to the true reflections on the second record is given by Equation 6 and is:

$$-\frac{(d_1 - d_2)}{V}$$

The first negative sign in the above expression indicates that a reference time position on the first record from shot point 21 would be decreased in time relative to a corresponding reference time position on the second record from shot point 22. With the indicated correction, the true reflections reproduced from the reproducible records obtained from shots 21 and 22 will be combined in phase and, hence, will be accentuated on the composite record produced by the recorder 31. This same correction will displace the ghost reflections on the second record by the same amount and, hence, will move them further out of phase. Thus, the time difference between the reproduced ghost reflections becomes (as expressed by Equation 7:

$$\frac{2(d_1 - d_2)}{V}$$

By suitable selection of the distance between shot points 21 and 22, the time expressed by Equation 7 can be made to equal 180° of phase displacement, with the result that, during compositing, the ghost reflections are eliminated or severely attenuated. In effect, half of the required time correction has been obtained directly by the relative displacement of the shots 21 and 22 and the other half is obtained indirectly by adjustment of the reproducing heads for the reproducible records before compositing. Through the combination of these two factors, the useful results described above are attained.

To consider an illustrative example of the method of the present invention, assume a velocity of propagation of 10,000 feet per second of seismic waves having a frequency of 50 cycles per second. The latter frequency corresponds to a period of 20 milliseconds and, therefore, a half period or out of phase condition is equal to 10 milliseconds.

Substituting these values in Equation 7 yields:

$$\frac{2(d_1 - d_2)}{V} = 10 \text{ milliseconds}$$

or $$(d_1 - d_2) = 50 \text{ feet}$$

Thus, for cancellation of the ghost reflections and an in phase relationship between the true reflections, shot points 21 and 22 should be spaced 50 feet apart and the reproducing heads of the apparatus 30 should be adjusted in the manner described above to introduce an equal correction, i.e., 10 milliseconds in time.

While the method described above, in order to facilitate the explanation, has been limited to two vertically spaced shot points, it will be evident that additional shot points may be employed by appropriate selection of the spacings between shots. The reproducible records will nevertheless be produced on a per shot basis and composited as described to eliminate ghost reflections and accentuate true reflections. For example, the signals from four shot points may produce records of the type shown in FIG. 2 on the visible records created by the recorder 32. These records have been designated 35 to 38, inclusive, and each exhibits a true reflection indicated by triangularly shaped mark 39, a ghost reflection indicated by circular marks 40 and a second true reflection indicated by square shaped mark 41. Obviously, it is extremely difficult to distinguish the true reflections 41 from the ghost reflections 40 as they appear upon the records 35 to 38. Compositing of only the signals represented by records 35 and 37 in the manner previously described yields a record as indicated at 42 in FIG. 3. The latter record shows recognizable true reflections at 39a and 41a but, as indicated at 40a, the ghost reflection has disappeared. Similarly, if the signals represented by all four of the records 35 to 38 are composited a record indicated as 43 in FIG. 3 will be produced. The latter record exhibits distinguishable true reflections at 39b and 41b but again the ghost reflections, as indicated at 40b, have been eliminated.

While a particular embodiment of the invention has been shown, it will be understood, of course, that the invention is not limited thereto since many modifications may be made, and it is therefore contemplated by the appended claims to cover any such modifications as fall within the true spirit and scope of the invention.

What is claimed as new and desired to be secured by Letters Patent of the United States is:

1. The method of seismic prospecting which comprises profiling a subsurface layer disposed beneath a reflecting interface by generating seismic waves from at least two vertically displaced shot points located below said interface, receiving said seismic waves at a detecting position spaced from said shot points, the received waves including true reflections from said layer, vertically displacing said shot points by such distance that ghost reflection energy arriving at said detecting position from one of said points as a result of reflection from both said interface and said layer is displaced in phase with respect to similar energy arriving at said detecting position from the other of said shot points, producing separate phonographically reproducible records on a per shot basis of the energy received at said detecting position from each of said shot points, reproducing and compositing said phonographically reproducible records in order to produce a composite record, and relatively time shifting the recorded signals prior to compositing in order to introduce a time displacement to the signals on at least one of said records having a value equal to the phase displacement between said ghost reflections, thereby substantially eliminating ghost reflections from the composite record and accentuating the true reflections.

2. The method of seismic prospecting which comprises profiling a subsurface layer disposed beneath a reflecting interface by generating seismic waves from at least two vertically displaced shot points disposed below said reflecting interface, receiving said seismic waves at a detecting position spaced from said shot points, vertically displacing said shot points by such distance that ghost reflections arriving at said detecting position from one of said points as a result of reflection from both said interface and said layer are ninety degrees out of phase with respect to similar ghost reflections arriving at said detecting position from the other of said shot points, producing separate phonographically reproducible records on a per shot basis of the energy received at said detecting position from each of said shot points, reproducing and compositing the signals on said phonographically reproducible records in order to produce a composite record, and relatively time shifting the recorded signals prior to compositing in order to introduce a time displacement to the signals on at least one of said records which displacement has a value equal to the phase displacement between said ghost reflections, thereby substantially eliminating ghost reflections from the composite record.

References Cited in the file of this patent

UNITED STATES PATENTS

| | | |
|---|---|---|
| 1,724,720 | McCollum | Aug. 13, 1929 |
| 1,919,917 | Truman | July 25, 1933 |
| 2,154,548 | Weatherly | Apr. 18, 1939 |
| 2,243,730 | Ellis | May 27, 1941 |
| 2,449,037 | Harkness | Sept. 7, 1948 |
| 2,732,906 | Mayne | Jan. 31, 1956 |
| 2,767,389 | McCollum | Oct. 16, 1956 |
| 2,806,545 | Schempf | Sept. 17, 1957 |
| 2,808,894 | Eisler et al. | Oct. 8, 1957 |
| 2,882,988 | Dobrin | Apr. 21, 1959 |

OTHER REFERENCES

Handley: "How Magnetic Recording Aids Seismic Operations," Oil and Gas Journal, vol. 52, No. 36, Jan. 11, 1954, pages 158 and 159.